United States Patent [19]

Fabrowsky

[11] Patent Number: 4,787,206

[45] Date of Patent: Nov. 29, 1988

[54] HYDRAULIC PRESSURE TRANSDUCER

[75] Inventor: Hans D. Fabrowsky, Neuhausen, Fed. Rep. of Germany

[73] Assignee: Herbert Haenchen KG, Ostfildern, Fed. Rep. of Germany

[21] Appl. No.: 78,354

[22] Filed: Jul. 28, 1987

[30] Foreign Application Priority Data

Jul. 30, 1986 [DE] Fed. Rep. of Germany ....... 3625805

[51] Int. Cl.[4] .......................... F15B 7/00; B60T 13/58

[52] U.S. Cl. .......................................... 60/560; 60/563; 60/565; 60/593

[58] Field of Search ................. 60/481, 560, 563, 565, 60/583, 593; 91/518, 531

[56] References Cited

U.S. PATENT DOCUMENTS

| | | | |
|---|---|---|---|
| 2,915,878 | 12/1959 | Hramoff | 60/563 |
| 3,511,048 | 5/1970 | Nemetz | 60/560 X |
| 3,633,365 | 1/1972 | Belknap | 60/560 |
| 4,153,180 | 5/1979 | Fernique | 60/560 X |

FOREIGN PATENT DOCUMENTS

| | | | |
|---|---|---|---|
| 2230492 | 1/1974 | Fed. Rep. of Germany | 60/560 |

*Primary Examiner*—Robert E. Garrett
*Assistant Examiner*—Mark A. Williamson
*Attorney, Agent, or Firm*—Christel, Bean & Linihan

[57] ABSTRACT

Hydraulic pressure transducer having an operating cylinder (10) with an operating piston (12) and operating piston rod (14) adapted for rapid traverse, and a transducer piston (22) and piston rod (24) guided within an axially connected power cylinder (20). The transducer piston rod (24) is of a smaller diameter than the operating piston rod (14) and is capable of plunging into the operating cylinder volume (16), the transducer piston rod (24) extending through a seal (58) separating said operating cylinder volume (16) from the power cylinder. In order to avoid repeated overtravel of the high pressure seal separating the traverse fluid inlet from the high pressure volume, a control sleeve (36) is guided on the piston rod (24) of the power cylinder, the control sleeve having a collar (38) near its front end, which is biased towards a stationary plane sealing surface (62) facing the operating cylinder (10) such that during the traverse stroke the control sleeve (36) is removed from the stationary plane sealing surface (42) and thus providing unobstructed admission for traverse stroke pressure fluid to the operating cylinder volume.

13 Claims, 1 Drawing Sheet

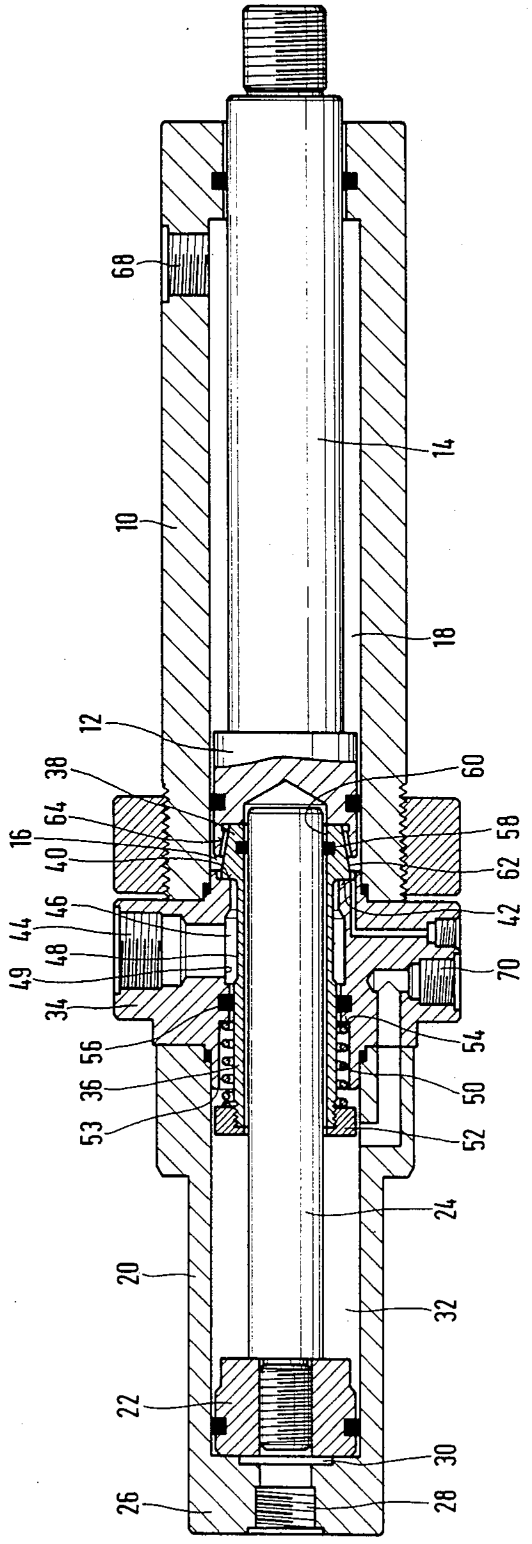
68
10
14
18
12
38
60
64
16
40
58
62
46
44
48
49
42
70
34
56
54
36
50
53
52
24
20
32
22
30
26
28

HYDRAULIC PRESSURE TRANSDUCER

The present invention relates to a hydraulic pressure transducer having an operating cylinder with an operating piston adapted for rapid traverse, and a hydraulic pressure transducer piston guided within an axially connected power cylinder, the piston rod of which has a cross-section smaller than that of the operating piston and is adapted to intrude into the operating cylinder volume and extend through a seal separating the operating cylinder volume from the driven-sided power cylinder volume, and further having a rapid traverse fluid flow inlet adapted for communication with the driving-sided operating cylinder volume, and a power stroke fluid inlet adapted for communication with the driving-sided power cylinder volume.

In a hydraulic pressure transducer of the kind above referred-to known from German Pat. No. 31 45 401 during the time of traverse stroke of the operating cylinder until the beginning of the power stroke a pressure is built up on the driven side of the pressure transducer piston, which is higher than the pressure constantly acting on the driving side of this piston. For generating this difference of pressure in the return flow of the pressure fluid issuing from the operating cylinder a throttle means is interposed and controlled dependently from the position of the pressure transducer piston. This throttle means is acting between a cylindrical central insert of the power cylinder having an axial outwardly leading bore and a plunger shiftable on said insert and operable to be moved as power transducer piston rod through a bore of a separating wall between the power cylinder and the operating cylinder into the driven side volume of the operating cylinder.

Apart from the relatively complicated construction necessary to form the throttle means the known pressure transducer has as additional disadvantage that the plunger of the power transducer acting as piston rod and provided to shut off the traverse stroke inflow into the bore of the separating wall at the beginning of the power stroke, thereafter has to overtravel a seal disposed in the bore of the separating wall in order to achieve a complete separation between the traverse stroke inlet and the power cylinder volume. It is known from practice with such devices that the service life of high pressure seals as used is considerably impaired, as it is permanently, i.e. at the beginning of every power stroke overtravelled by the transducer piston rod and so undergoes increased wear.

It is an objective of the invention to improve the hydraulic pressure transducer of the kind referred-to such as to avoid the before described disadvantages and difficulties resulting from the necessity of repeatedly overtravelling the high pressure seal separating the traverse stroke inflow from the high pressure volume and to create a type of construction, wherein simple means ensure a wear-resistent separation and sealing of the that volume, to which high pressure fluid is admitted during the power stroke, against the traverse stroke inlet and other sensitive areas of the device.

In a hydraulic pressure transducer of the kind referred-to a solution according to the invention is characterized in that a control sleeve is sealingly guided on the piston rod of the power cylinder, has a collar near its end adjacent the operating cylinder, and with its surface averted from the operating cylinder is biased against a stationary plane sealing surface, and in that the traverse stroke inlet opens into an annular space which during the traverse stroke operating mode when the control sleeve is raised from the plane sealing surface, continues as unobstructed entrance for the traverse stroke pressure fluid past said plane sealing surface to a driving end of the operating cylinder volume.

In the proposed construction, when pressure fluid is admitted to the traverse stroke inlet the control sleeve subject to its differential surfaces is moved towards the operating piston in order to permit inflow of fluid for traverse stroke of the operating piston. As the control sleeve is guided with very close-tolerance clearance on the transducer piston rod such that the high pressure circumferential seal associated to those mating surfaces encounters optimum conditions in order to be able to provide effective sealing even against highest pressures of 800 bar and more, such that extrusion of the seal body through the clearance slit will not take place. Practically speaking, control sleeve and transducer piston rod form one unit due to the small tolerances and so are operable to execute common movements, by which the sealing action of the circumferential seal on the transducer piston rod is not impaired. At the end of the traverse stroke the control sleeve due to its spring bias returns into the shut-off position, in which its collar engages the stationary plane sealing surface, which may be formed such that its tightness will grow with increasing pressure.

Additional features and advantages will become apparent from the following description of a preferred embodiment, from the claims and also from the drawing showing details of inventional importance. The various aspects of the claims separately or in any combination may be realized in one or a plurality of other embodiments of the invention. Only for sake of simplicity independent claims directed to such single aspects and other combinations are not separately carried out.

In the drawing a hydraulic pressure transducer according to an embodiment of the invention is schematically shown in longitudinal section.

The transducer comprises an operating cylinder 10, having an operating piston 12 connected to a piston rod 14 which is sealingly guided by the front or right hand end of the cylinder 10. Pressure fluid is admitted to the driving-sided operating space or volume 16 at the rear side of piston 12 through rapid traverse inlet 44 disposed in an annular connecting member 34.

The annular connecting member 34 is bolted together with an annular flange fixed to the rear end of operating cylinder 10 and at its opposite end is connected to a circumferentially thickened end of a power cylinder 20. The power cylinder includes a transducer piston 22 having a transducer piston rod 24 connected thereto. In the shown rest position of the operating piston 12, the front end of piston rod 24 extends with clearance into a rear recess 64 of this operating piston. In an end cover 26 of cylinder 20 a pressure fluid inlet 28 for forward stroke of the transducer piston 22 opens into the driving-sided transducer volume 30. The well-known action of a power transducer is such that the free end of piston rod 24 acting as a plunger intrudes into the oil-filled and totally sealed space on volume 16 of operating cylinder 10 and consequently will be effective on a relatively short power stroke with the difference of cross-sectional area between piston rod and piston, such that the operating piston rod 14, which initially has been advanced at traverse rapid speed, now is actuated along a smaller length with reduced speed and at an increased power.

As soon as increased outer resistance will become apparent against further extension of operating piston rod 14 switch-over from its rapid traverse speed to power speed may be effected by means of known control apparatus such to the end that a continuous transition will take place from one operating mode to the other, for example such that, when the fluid inflow at 44 for rapid traverse is controlledly throttled towards zero inflow at the same time already pressure fluid is admitted to the inlet port 28 for the power stroke.

In order to have pressure fluid unobstructedly admitted from the rapid traverse inlet 44 into the operating space 16 of the operating cylinder, and further to be able to shut off fluid inflow from the rapid traverse inlet in manner of being tight against, pressure high during the transition from the rapid traverse mode to the power stroke mode, when the stroke of the transducer piston and its piston rod begins, according to the invention there is provided a control sleeve 36 having its front end enlarged by a collar 38. The rear face 40 of collar 38 averted from the operating piston 12 preferably is carried out as radially extending plane sealing surface and is associated with an opposite stationary plane sealing surface 42 forming part of the annular connecting member 34.

The inlet 44 for admitting rapid traverse pressure fluid is enlarged into an annular space 46 encircling the control sleeve 36 and extending up to the plane sealing surface 42, and partially consisting of a recess or circumferential groove 48 of control sleeve end partially of a correspondingly enlarged inner bore 49 or groove within annular connecting member 34.

Rearwardly from its recess 48 the control sleeve 36 has its original larger diameter, and at this area it is sealed against the driven-sided transducer cylinder volume 32 by means of an outer circumferential seal 56 disposed within an annular groove of the annular connecting member 34. Preferably by means of a restoring spring 50 the control sleeve may be biased towards its closed end position as shown in the drawing. The restoring spring 50 bears against a stationary support face 54 of connecting member 34, and its opposite end is in engagement with a rear collar 52 of control sleeve 36. This restoring spring can be dispensed with, if by means of known outer hydraulic control devices a progressive switch-over is effected from the rapid traverse mode to the power stroke mode. During forward movement the cylinder volumes 32 and 18 are in connection with each other, and at the beginning of the power stroke the control sleeve is automatically shifted rearwardly against the high pressure seal.

In the shown embodiment the forwardly disposed collar 38 of control sleeve 36 extends from the rear plane sealing surface 40 to the front end of control sleeve and has a forwardly tapering peripheral surface 62 projecting into an associated conically flared rear end of recess 64 within operating piston 12. The conical form is used here in view of a simplified and space saving accommodation and further in view of providing a large plane sealing surface 40.

The annular connecting member 34 further includes an inlet connection 70 to admit pressure fluid into the driven-sided transducer cylinder volume 32. This inlet 70 may be in connection by means of a non-shown control valve with the inlet connection 68 for rearward traverse stroke of the operating piston, when during the forward traverse stroke fluid is displaced out of the driven-sided operating volume 18 in order to maintain transducer piston 22 during forward rapid traverse motion of the operating piston rear within its shown rest position.

As soon as the supply of pressure fluid through traverse inlet connection 44 is shut off, or as soon as the operating piston 12 is acting against an increased pressure, while the transducer piston 22 is acted upon by pressure fluid from inlet connection 28, the control sleeve 36 returns into the shown shut off position, in which the plane sealing surfaces 40, 42 engage each other and so are able to seal the high pressure within operating volume 16 against the rearward areas of the device.

In a non-shown embodiment of the transducer device the control sleeve may have a collar 38 similar to that of control sleeve 36, but which for forming a high pressure seal during the power stroke is provided with a peripheral sealing surface instead of having a rearward plane sealing surface 40, and which cooperates with an associated radially inwardly directed peripheral sealing surface within the stationary annular connecting member 34. As soon as an increased resistance will act against the traversing operating piston, or as soon as pressure fluid is admitted to the driving-sided transducer cylinder volume 30, the control sleeve with its collar, similarly as described before with respect to the drawing, will be moved to the left.

In this alternative embodiment the left end of the cylindrically formed collar may preferably have a conically tapered entrance guide surface, which ensures a centered entrance of the collar with its peripheral sealing surface into the inner peripheral sealing surface within the annular connecting member 34. This internal sealing surface is limited in axial direction by a radial edge similar to that of plane surface 42, but in this case it remains without any function. The rearward stroke of the control sleeve may be limited by any stop, which preferably remains without fluid pressure. The rear collar 52 may have an opposite stop, or other non-shown means may be provided for limiting the rearward stroke of control sleeve.

I claim:

1. A hydraulic pressure transducer having an operating cylinder with an operating piston means adapted for rapid traverse, and a pressure transducer piston means guided within an axially connected power cylinder, the piston rod of which having a cross-section smaller than that of the operating piston and adapted to intrude into the operating cylinder volume and extending through a seal separating the operating cylinder volume from the driven-sided power cylinder volume, and further having a rapid traverse flow fluid inlet adapted for communication with the driving-sided operating cylinder volume, and a power stroke fluid inlet adapted for communication with the driving-sided power cylinder volume, the improvement being characterized in that a control sleeve (36) is sealingly guided on the piston rod (24) of the power cylinder (20), has a collar (38) near its front end adjacent the operating cylinder (10), and with its surface (40) averted from said operating cylinder is biased towards a stationary plane sealing surface (42) and in that the rapid traverse flow inlet (44) opens into an annular space (46) encircling said control sleeve (36), and during the rapid traverse operating mode, when the control sleeve is removed from the stationary sealing surface, is extended as unobstructed admission opening for traverse stroke pressure fluid past said plane sealing surface (42) to the driving-sided operating cylinder volume (16).

2. The hydraulic pressure transducer as set forth in claim 1, wherein the control sleeve is sealed at its outer circumference with respect to a stationary part of the cylinder at a position, by which said annular space is closed on the side of the traverse fluid inlet (44) opposite with respect to said stationary plane sealing surface (42).

3. The hydraulic pressure transducer as set forth in claim 1, wherein the control sleeve near its leading end is sealed by an inner circumferential seal (58) bearing against the transducer piston rod (24), and is guided by means of an inner guiding surface (60) with narrow clearance on the transducer piston rod.

4. The hydraulic pressure transducer as set forth in claim 3, wherein said collar is tapered and extends from its rear side cooperating with the stationary plane sealing surface to the leading end of the control sleeve, and wherein said inner circumferential seal (58) as well as the inner guiding surface are disposed between the ends of the collar.

5. The hydraulic pressure transducer as set forth in claim 1, wherein the rear end of the operating piston includes a central recess (64) for accomodating in its retracted end position the leading end of the transducer piston rod and the collar of control sleeve circumferential clearance.

6. The hydraulic pressure transducer as set forth in claim 1, wherein on the outer circumference of the rear end of said control sleeve an annular stop (52) is provided, on which one end of a restoring spring (50) encircling the control sleeve is supported, which at its other end engages a stationary bearing surface (54).

7. The hydraulic pressure transducer as set forth in claim 6, wherein said annular stop (52) of the control sleeve is associated to a stationary opposite stop (53) such that the spacing between both stops defines the maximum length of opening stroke of the control sleeve corresponding to the greatest distance between the rear side of the front collar and from the stationary plane sealing surface.

8. The hydraulic pressure transducer as set forth in claim 1, wherein between the rear end of operating cylinder and front end of power cylinder an annular connecting member (34) is sealingly interposed, which includes the transverse fluid inlet (44) connected to an inner annular recess (46), further said stationary plane sealing surface (42), an outer circumferential seal (56) cooperating with the circumference of the control sleeve, and a fluid inlet (70) for return stroke of transducer piston (22).

9. The hydraulic pressure transducer as set forth in claim 1, wherein said stationary plane sealing surface (42) and the associated rear side of the collar on the control sleeve are provided with additional sealing surfaces or surface portions made from elastomer or plastomer material.

10. A hydraulic transducer having an operating cylinder with an operating piston means adapted for rapid traverse, and a pressure transducer piston means guided within an axially connected power cylinder, the piston rod of which having a cross-section smaller than that of the operating piston and plunging into the operating cylinder volume and extending through a seal separating the operating cylinder volume from the driven-sided power cylinder volume, and further having a traverse stroke fluid inlet communicating with the driving-sided operating cylinder volume, and a power stroke inflow in communication with the driving-sided power cylinder volume, the improvement being characterized in that a control sleeve is sealingly guided on the piston rod of the power cylinder and has a collar near its end adjacent the operating cylinder, at least the end of the collar averted from the operating cylinder or its outer circumference cooperating with a stationary, preferably metallic sealing surface, and in that the traverse stroke inlet opens into an annular space encircling said control sleeve, while said annular space during the traverse stroke operating mode, when the control sleeve is removed from the stationary sealing surface, is extended as unobstructed admission opening for traverse stroke pressure fluid past said sealing surface to the driving-sided operating cylinder volume.

11. Hydraulic pressure transducer as in claim 10, wherein a high pressure seal is effective between the cylindrical outer circumference of the collar of the control sleeve and the correspondingly sized inner circumference of a stationary part of the cylinder housing and is axially limited towards the operating cylinder by a stationary outwardly directed radial edge.

12. Hydraulic pressure transducer as in claim 11, wherein the outer circumferential sealing surface of the collar near its end averted from the operating cylinder has a portion of gradual transition into a conically tapering portion as centering aid for guiding entrance into the stationary inner circumferential sealing surface.

13. A hydraulic pressure transducer having an operating cylinder; an operating piston means disposed within said operating cylinder, said operating piston means being adapted for rapid traverse; a power cylinder and annular connecting member connected to the operating cylinder in axial alignment therewith; a pressure transducer piston means guided within the power cylinder and including a piston rod having a cross-section smaller than that of the operating piston means, the piston rod being adapted to extend through and move relative to the annular connecting member into the operating cylinder; a seal carried by the annular connecting member and separating the driving-sided operating cylinder volume from the driven-sided power cylinder volume, the piston rod extending through the seal; a fluid inlet in the annular connecting member adapted to communicate with the driving-sided operating cylinder volume; and a fluid inlet in the power cylinder adapted to communicate with the driving-sided power cylinder volume; the improvement being characterized in that a control sleeve is sealing guided on the piston rod for movement relative thereto, the control sleeve having a collar near its front end adjacent the operating cylinder, the collar being provided with a sealing face averted from the operating cylinder, a stationary sealing surface on the annular connecting member, the collar being biased towards the last mentioned sealing surface, and in that the fluid inlet in the annular connecting member opens into an annular space encircling the control sleeve.

* * * * *